(12) United States Patent
Gomi

(10) Patent No.: US 7,839,518 B2
(45) Date of Patent: Nov. 23, 2010

(54) PRINT CONTROL METHOD, INFORMATION PROCESSING APPARATUS, PRINTING SYSTEM, PRINT CONTROL PROGRAM AND RECORD MEDIUM

(75) Inventor: Tomohiro Gomi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1644 days.

(21) Appl. No.: 10/446,718

(22) Filed: May 29, 2003

(65) Prior Publication Data

US 2003/0223795 A1 Dec. 4, 2003

(30) Foreign Application Priority Data

May 31, 2002 (JP) ............................. 2002-160660
Apr. 24, 2003 (JP) ............................. 2003-120496

(51) Int. Cl.
*G06K 7/00* (2006.01)

(52) U.S. Cl. ...................... 358/1.15; 358/1.14; 399/81; 709/223; 713/300

(58) Field of Classification Search ................ 358/1.14, 358/1.15, 1.16, 1.13, 1.1, 1.17, 1.2, 1.12; 710/15, 16, 17, 18; 709/203, 223, 227, 224, 709/238, 242; 399/81, 82, 85; 713/300, 713/324

See application file for complete search history.

(56) References Cited

U.S. PATENT DOCUMENTS

| 6,170,010 | B1 * | 1/2001 | Hirata et al. ................ 709/223 |
| 6,724,494 | B1 * | 4/2004 | Danknick ................ 358/1.14 |
| 6,785,487 | B2 * | 8/2004 | Maeda et al. ................ 399/81 |
| 6,995,851 | B2 * | 2/2006 | Sakamoto ................ 358/1.14 |
| 7,167,260 | B2 * | 1/2007 | Iwata et al. ................ 358/1.15 |
| 7,359,075 | B2 * | 4/2008 | Kimura ................ 358/1.15 |
| 2003/0053109 | A1 * | 3/2003 | Lester et al. ................ 358/1.14 |
| 2003/0095279 | A1 * | 5/2003 | Kim ................ 358/1.14 |
| 2003/0103235 | A1 | 6/2003 | Gomi ................ 358/1.15 |

FOREIGN PATENT DOCUMENTS

| JP | 2001-290623 | 1/2001 |
| JP | 2001-290626 | 1/2001 |
| JP | 2001-105691 | 4/2001 |
| JP | 2001-109599 | 4/2001 |
| JP | 2001-113762 | 4/2001 |
| JP | 2001-138584 | 5/2001 |

* cited by examiner

*Primary Examiner*—Edward L Coles
*Assistant Examiner*—Ashish K Thomas
(74) *Attorney, Agent, or Firm*—Fitzpatrick, Cella, Harper & Scinto

(57) ABSTRACT

In the cases where a host side is powered off or something similar occurs, a print job which may have failed is recovered and managed as a recovered job from an intermediate file held on the host without a termination notice on starting the host next time, and if there is an instruction for reprinting, as for the print job so instructed, regeneration is performed from the intermediate file for the sake of re-creating the print job so as to re-execute a printing process.

6 Claims, 10 Drawing Sheets

PRINT CONTROL METHOD, INFORMATION PROCESSING APPARATUS, PRINTING SYSTEM, PRINT CONTROL PROGRAM AND RECORD MEDIUM

BACKGROUND OF THE INVENTION

1. Field of the Invention

The present invention relates to a print control method, an information processing apparatus, a printing system, a print control program and a record medium utilizing bi-directional communication, constituted by connecting computer equipment to printers.

2. Related Background Art

As for timing for sensing termination of printing in the case of having executed a print job, a printer in the past displays the termination of printing when the job is completely transferred from a printer queue on a host computer side to a receiving memory of an input-output apparatus such as the printer, or displays the termination of printing by performing event notification to the host computer side when the job is page-ejected from the receiving memory on the input-output apparatus side such as the printer.

As for the above example in the past, however, it is not possible to perform a recovery printing process on starting the host computer next time in the case where the host computer is powered off due to some failure in a stage where the termination of the job is not recognized by a printing system.

An object of the present invention is to provide a print control method, an information processing apparatus, a print control program and a record medium capable of assuring the printing even in the case where the printing is not normally terminated.

SUMMARY OF THE INVENTION

To attain the above object, according to the present invention, in the case where a system is restarted without receiving a printing termination notice from input-output apparatuses after sending a distributed print job to a plurality of input-output apparatuses in an information processing apparatus connected to the plurality of input-output apparatuses having a printing function via a network for bi-directionally communicating with the plurality of input-output apparatuses, it is possible, when it is predictable that the printing will not be normally terminated, to realize an environment capable of assuring output of the printing by recovering a distributed job based on an intermediate file for generating each distributed job of the distributed print job and inputting an instruction to execute the recovered print job.

Or in the case where, in a mechanism of the information processing apparatus capable of communicating with a printer via a predetermined communication line, a job based on the intermediate file for generating the job is generated to transfer the generated job to the printer and it is restarted without termination of the transferred job being recognized, it is possible, when it is predictable that the printing will not be normally terminated, to present a list for prompting reprinting and allowing the reprinting to a user and thereby realize an environment capable of assuring the printing.

DESCRIPTION OF THE PREFERRED EMBODIMENTS

Figure 1:
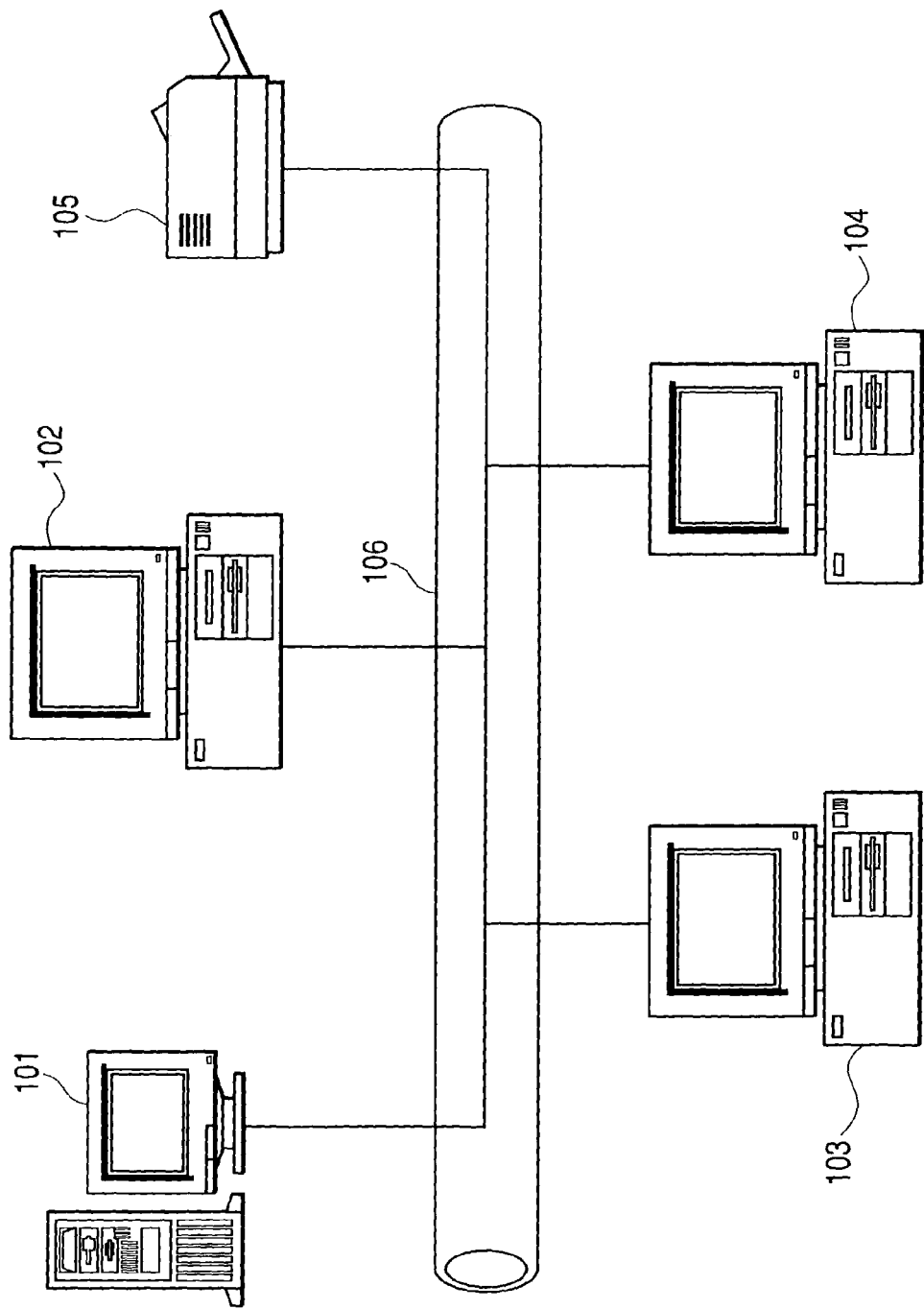
FIG. 1 is a block diagram showing a configuration of a printing system relating to an embodiment of the present invention.

Hereafter, a printing system relating to embodiments of the present invention will be described in detail by referring to the drawings.

FIG. 1 is a block diagram showing a configuration of a printing system relating to the embodiments of the present invention.

In FIG. 1, reference numerals 102, 103 and 104 denote information processing apparatuses as client computers (hereafter, referred to as clients) which are connected to a network 106 by a network cable such as Ethernet (R), capable of executing various programs such as an application program, and have a printer driver with a function of converting print data into a printer language supporting the printer mounted thereon. They also have a communication apparatus capable of bi-directionally communicating with other apparatuses connected to the network 106.

The printer driver supports a plurality of printer drivers. The printer (input-output apparatus) may be of any of various methods such as a laser beam printer adopting an electrophotographic method, an inkjet printer adopting an inkjet method and the printer utilizing a thermal-transfer method.

Reference numeral 101 denotes the information processing apparatus as a server which is a host computer (hereafter, referred to as a print server). The print server 101 is connected to the network 106 by the network cable so as to accumulate files used on the network 106 or monitor usage state of the network 106. The print server 101 has the communication apparatus capable of bi-directionally communicating with the other apparatuses connected to the network 106, and also manages a plurality of printers.

The clients 102 to 104 and print server 101 are general information processing apparatuses. The print server 101 can also have the functions of the clients 102 to 104. The clients and print server have a print control program for exerting different control respectively stored therein in an executable state.

The print server 101 further has the functions of storing and printing print jobs including the print data of which print requests were made by the clients 102, 103 and 104, receiving only job information excluding the print data from the clients 102, 103 and 104, managing printing order of the clients 102, 103 and 104, notifying the client having a turn doing of permission to transmit the print job including the print data, or obtaining various information on a status of a network printer 105 and the print jobs and notifying the clients 102, 103 and 104 thereof.

Reference numeral 105 denotes the network printer as a print control apparatus which is connected to the network 106 via a network interface not shown and analyzes the print jobs including the print data sent from the clients 102, 103 and 104 so as to convert them into a dot image page by page and print each page. The network 106 has the clients 102, 103 and 104, server 101 and network printer 105 and so on connected thereto.

Figure 2:
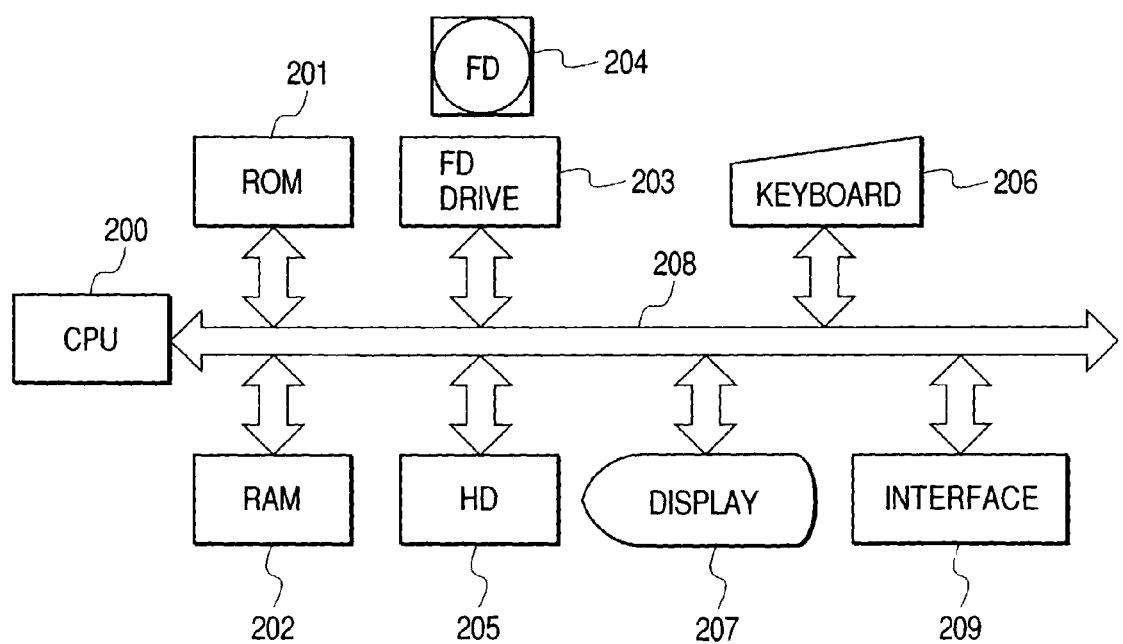
FIG. 2 is a block diagram showing the configuration of a client in FIG. 1.

FIG. 2 is a block diagram showing the configuration of the client in FIG. 1. The server 101 also has the same or equivalent hardware configuration. Therefore, only the configuration of the client will be described hereafter while omitting a description of the configuration of the server 101.

In FIG. 2, reference numeral 200 denotes a CPU as controlling means of the clients 102, 103 and 104, which exerts control for executing the application program, printer driver program, OS and network printer control program of the present invention and so on stored in a hard disk (HD) 205 and temporarily storing the information, file and so on necessary for execution of the programs in the RAM 202.

Reference numeral 201 denotes an ROM as storage means which stores the programs such as a basic I/O program and various data such as font data to be used on document processing and data for templates therein. Reference numeral 202 denotes the RAM as a temporary storage means, and functions as a main memory, a work area and so on of the CPU 200.

Figure 5:
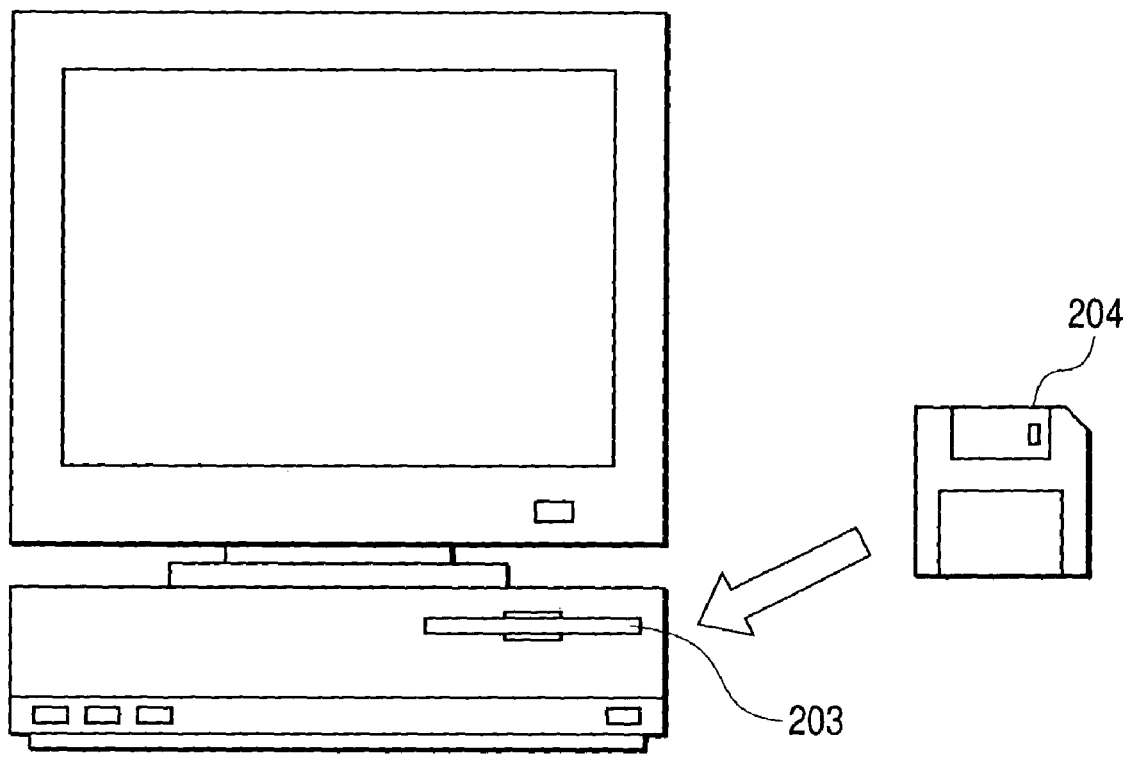
FIG. 5 is a diagram showing an FD drive 203 and the FD 204 to be inserted therein in FIG. 2.

Reference numeral 203 denotes a floppy (R) disk (FD) drive as storage medium reading means. As shown in FIG. 5 mentioned later, it is possible, via the FD drive 203, to load the programs and so on stored on a floppy (R) disk (FD) 204 as the storage medium on this computer system which is the client. The storage medium is not limited to the FD but may be arbitrary, such as a CD-ROM, a CD-R, a CD-RW, a PC card, a DVD, an IC memory card, an MO or a memory stick.

The FD 204 has the program readable by a computer stored therein.

Reference numeral 205 denotes one of the external storage means, which is the hard disk (HD) for functioning as a bulk memory having the application program, printer driver program, OS and network printer control program, related programs and so on stored therein. Furthermore, a spooler is secured therein. The spooler is a client spooler in the case of the client, and is a server spooler in the case of the print server. In the case of the print server, a table for storing job information received from the client and controlling order is also generated and stored in this external storage means.

Reference numeral 206 denotes a keyboard (instruction input means) with which a user inputs an instruction such as a control command and so on of a device to the client and an operator or an administrator inputs the same to the print server.

Reference numeral 207 denotes a display (display means) for displaying the command, a printer state and so on inputted from the keyboard 206.

Reference numeral 208 denotes a system bus for controlling a data flow inside the computer which is the client.

Reference numeral 209 denotes an interface (input-output means) via which the client exchanges the data with an external apparatus.

Figure 3:
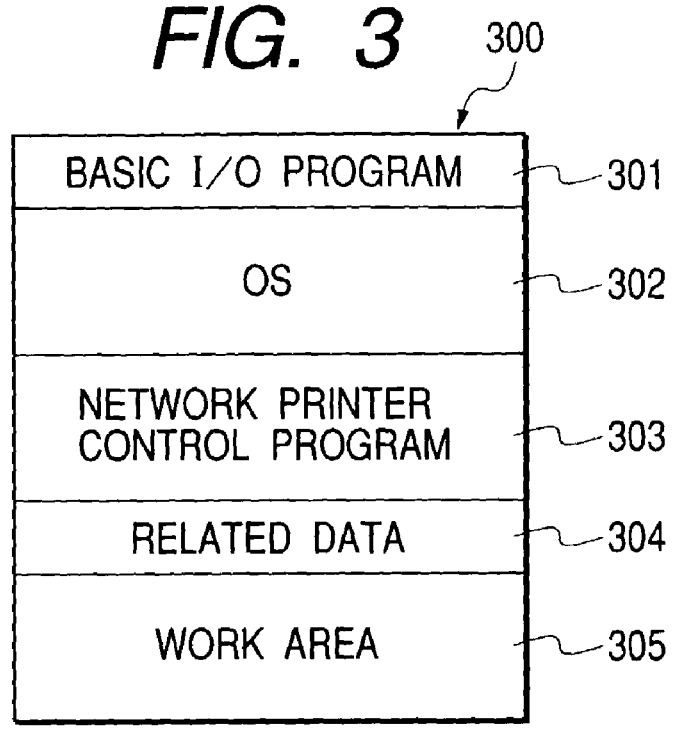
FIG. 3 is a diagram showing an example of a memory map of an RAM 202 in FIG. 2.

FIG. 3 is a diagram showing an example of a memory map of an RAM 202 in FIG. 2. This is the memory map wherein the above network printer control program is loaded from the FD 204 to the RAM 202 so as to be executable.

This embodiment shows an example of directly loading the network printer control program and related data from the FD 204 to the RAM 202. However, it is also feasible, other than that, to load the network printer control program already installed in the HD 205 to the RAM 202 each time the network printer control program is operated from the FD 204.

The medium for storing the network printer control program may also be the CD-ROM, CD-R, PC card, DVD or IC memory card other than the FD. Furthermore, it is also possible to store the network printer control program in the ROM 201 and constitute it to be a part of the memory map so as to have it directly executed by the CPU 200.

It is also possible to constitute it with software, instead of hardware items, for implementing the functions equivalent to the above apparatuses.

The network printer control program may also be simply called a print control program. The print control program includes a program for exerting control to provide an instruction to change a printing destination of the print job and change the printing order on the client, and also includes a program for controlling print job order and giving notice of finishing printing of the print job and a request for change of the printing destination on the print server. As for the print control program for exerting such control, a module to be installed on the client may be separated from the module to be installed on the print server, or one print control program may function as the one for the client or function as the one for the print server depending on the environment in which it is executed. Or it may have a configuration wherein the module for functioning as the client and the module for functioning as the print server are installed together on one computer so as to be simultaneously or time-dividedly and artificially operated in parallel.

Reference numeral 301 denotes the basic I/O program, and is an area including a program having an IPL (Initial Program Loading) function of having the OS read from the HD 205 to the RAM 202 and starting the operation of the OS at power-on of a controller.

Reference numeral 302 denotes an operating system (OS) and 303 denotes the network printer control program, to be stored in the area secured on the RAM 202. Reference numeral 304 denotes the related data which is also stored in the area secured on the RAM 202. Reference numeral 305 denotes a work area where the area for the CPU 200 to execute the printer control program is secured.

Figure 4:
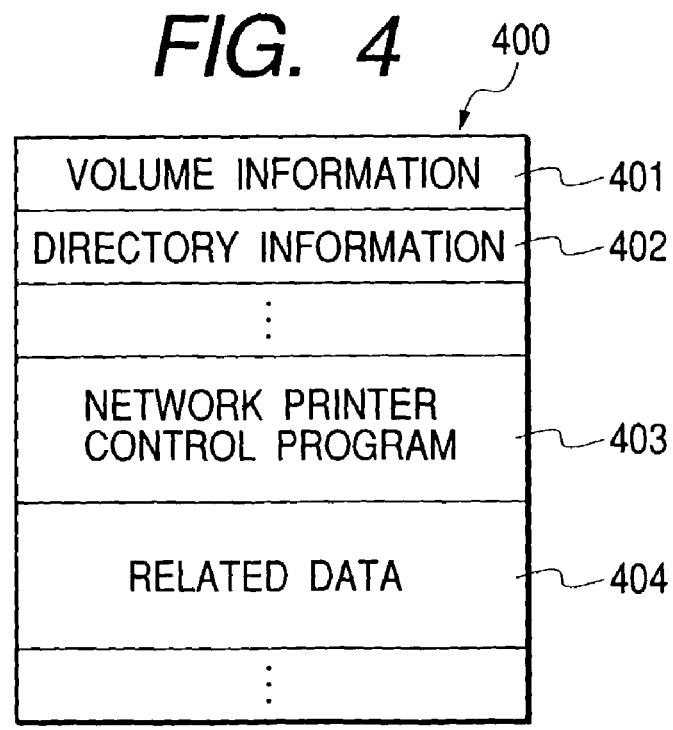
FIG. 4 is a diagram showing an example of the memory map of an FD 204 in FIG. 2.

FIG. 4 is a diagram showing an example of the memory map of the FD 204 in FIG. 2. In FIG. 4, reference numeral 400 denotes data contents of the FD 204, 401 denotes volume information indicating the data information, 402 denotes directory information, 403 denotes the network printer control program which is the print control program mentioned later, and 404 denotes the related data thereof.

The network printer control program 403 is programmed based on the flowchart mentioned later, and both the clients and server have the same configuration.

FIG. 5 is a diagram showing the FD drive 203 and the FD 204 to be inserted therein in FIG. 2. The same portions as those in FIG. 2 are given the same symbols.

In FIG. 5, the FD 204 has the network printer control program and related data stored therein.

Next, a print job control system for performing the above-mentioned printing process such as distribution, broadcast and substitution by using a plurality of printers according to this embodiment will be described.

According to this embodiment, a group printer driver is a driver capable of providing unified instructions for print setup to individual printer drivers corresponding to a plurality of printer devices respectively and also generating base data (general-purpose document data) for generating a general-purpose print file intended for a de-spooler described later to notify each printer driver of a drawing instruction. The individual printer drivers dependent on the printer devices are called member printer drivers.

Figure 6:
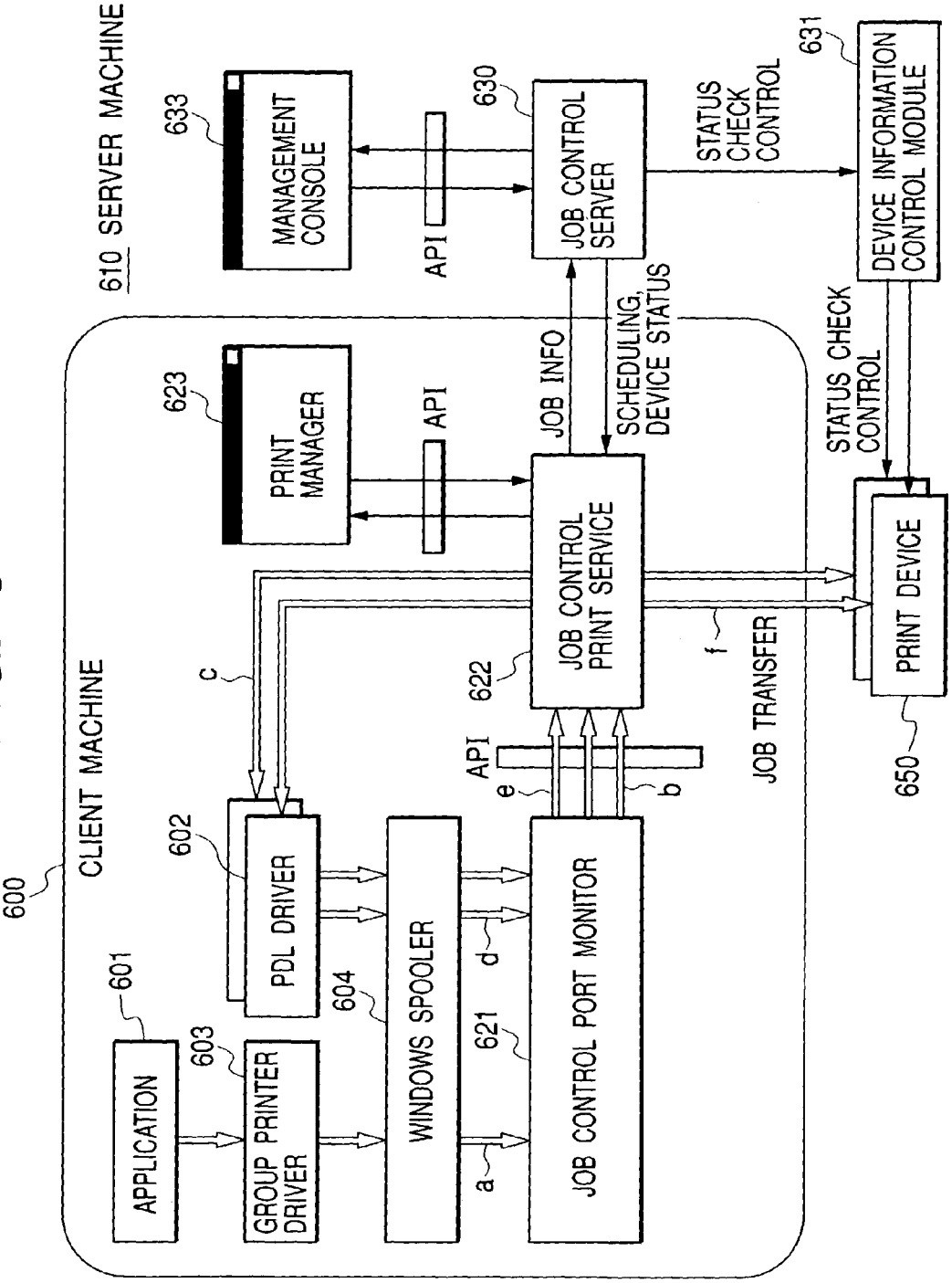
FIG. 6 is a diagram showing how a print job issued from the client is processed in a print job control system.

FIG. 6 is a diagram showing how the print job issued from the client is processed in the print job control system. In FIG. 6, reference numeral 600 denotes a client machine, referring to a machine on which a client module of the print job control system operates.

Under ordinary circumstances, if the instruction for printing is provided from a general application such as Microsoft Word (R), the application program has a series of drawing instructions generated via a graphic function of the OS, and the drawing instructions are passed to Windows (R) Spooler 604 by way of the printer driver. The Windows (R) Spooler 604 takes a procedure for passing print job data to a port monitor selected by the user and having it sent to a printer device 650.

The user provides the instruction for printing by specifying a port monitor 621 for the print job control system (hereafter, referred to as a job control port monitor) in advance. The application program 601 generates the drawing instructions via a series of OSs.

A group printer driver 603 having received the drawing instructions generates the general-purpose document data for generating a general-purpose print file, and sends it to the job control port monitor 621 as the print job data. The job control port monitor 621 sends the print job data to print service 622 for the print job control system (hereafter, referred to as the job control print service). The job control print service 622 has the function of managing the state of the jobs and devices controlled by a job control server 630. Furthermore, in the case where the device and client mutually operate in a peer-to-peer connection environment, the job control print service 622 has the functions of managing the information such as the device state and job state notified by the devices and providing a predetermined instruction to the devices. This is equivalent to the function of managing the device information and job information of a plurality of printer devices 650.

A print manager 623 for the print job control system (hereafter, referred to as the job control print manager) is the program for providing a user interface (UI) intended for the user to examine what state the print job is in the job control print service 622 and operate the print job.

The job control print manager 623 has the functions of sending and receiving the information to and from the job control print service 622 via the interface (API) of the software of the job control print service 622 and mainly obtaining as an event the information on the state of external printer devices managed by the job control print service 622. As for the types of notification of events, presumable notification of error and warning information includes a warning that the remaining amount of toner is little, a communication failure between the client and device, shortage of memory, an output tray being overfilled and notification of normal information on return from an error state to a normal state.

The server 630 for the print job control system (hereafter, referred to as the job control server) centrally controls (schedules) the timing for the job control print service 622 on each client 600 to send the print job data to the printer device 650. The job control server 630 also has the functions of monitoring statuses of the devices (printers) capable of communication via a network such as execution of printing, power control condition and failure information (paper jam) and notifying the job control print service 622 of the event. Here, as for monitoring of the change in the printer status, the job control print service 622 can also obtain a notice (event) of the change in the state directly from the printer devices.

A management console 633 for the print job control system (hereafter, referred to as the job control management console) can monitor the entire print job control system by exchanging the information and instructions with the job control server 630 via the API intended to be accessed by the software belonging to the job control server 630.

The job control server 630 performs the communication with each printer device 650 by using a device information control module 631 so as to obtain the information on the print jobs and operational state in each printer and operate it. The obtained information can be passed to the job control print service 622 on the client 600 side.

Next, the printing from the group printer driver 603 according to this embodiment will be described.

The group printer driver 603 generates the general-purpose document data described above with a series of drawing commands generated by the application program. This general-purpose document data is converted by the job control print service 622 into a general-purpose print file which is a file in an intermediate format not dependent on the type of the printer device. The configuration of the general-purpose print file will be described later.

As previously mentioned, the general-purpose print file goes through the job control port monitor 621 from the Windows (R) Spooler 604 (a) and is led to the job control print service 622 (b). The job control print service 622 generates the drawing command based on the general-purpose print file according to the type of job control exerted to the print job (c), and a PDL driver 602 subsequently renders the drawing command as a PDL file interpretable by the printer device 650. FIG. 6 shows an example wherein the job control of dividing the print job into two is exerted in the job control print service 622, and the example of having two member jobs generated is indicated by two arrows (c). The member jobs in this case are equivalent to child jobs in FIGS. 9 to 11 described later.

The PDL file generated by the PDL driver 602 goes through the Windows (R) Spooler 604 and the job control port monitor 621 (d) and is passed to the job control print service 622 again (e). The job control print service 622 sends the print job data of the PDL to the printer device 650 according to the instruction of the job control server 630 (f).

The job control print service 622 logically divides one general-purpose print file into a plurality of print jobs and sends them to different printer devices or resends the print job data sent once to another printer device as instructed by a print instruction in the general-purpose print file. The (c), (d), (e) and (f) in FIG. 6 indicate routes of the print job data in such cases.

In the case where application software creates the general-purpose print file and that software directly puts in the general-purpose print file as the print job, it is different from a general application as to how the information is passed to the group printer driver 603 and the contents of processing in the group printer driver 603. As previously mentioned, in the case of the general application, the application calls a GDI function of Windows (R) as with an ordinary printer driver when passing drawing information to the group printer driver 603, and the group printer driver 603 generates the general-purpose document data according to it, and then the generated general-purpose document data is generated as the general-purpose print file by the job control print service 622. As opposed to this, in the case of the application for directly creating the general-purpose print file, the application already has the general-purpose print file and provides it to the group printer driver 603. The group printer driver 603 rewrites the print instruction in the general-purpose print file based on a preset print method as required so as to send it to the Windows (R) Spooler 604.

Figure 7:
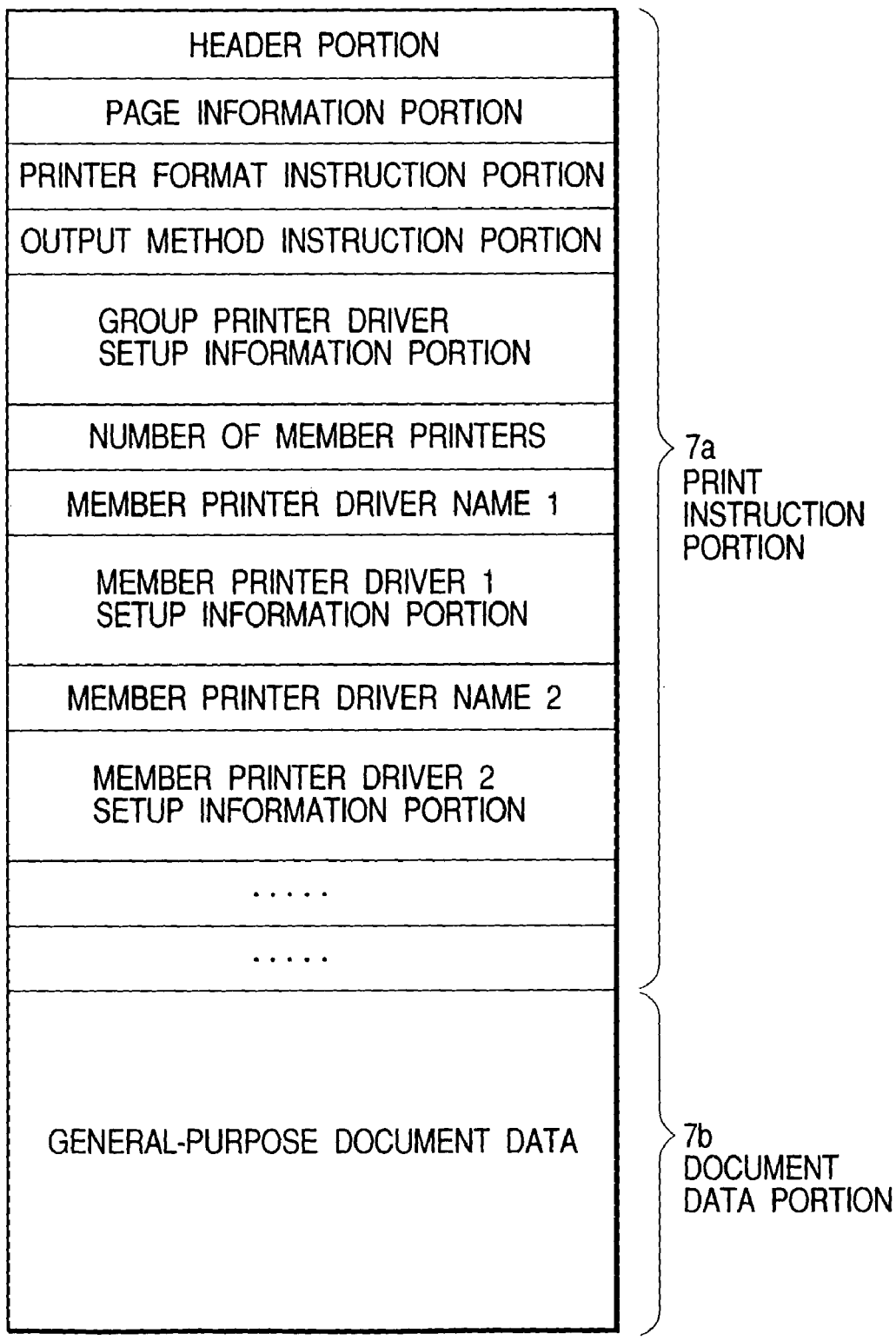
FIG. 7 is a diagram showing an example of the configuration of a general-purpose print file.

FIG. 7 is a diagram showing an example of the configuration of the general-purpose print file.

The general-purpose print file used in this embodiment is comprised of a print instruction portion 7a and a document data portion 7b. The print instruction portion is the portion describing document information and the print instructions. The document data is the data of the application converted into the data in a general-purpose format, which is a data format not dependent on a printer language.

The print instruction portion is comprised of a header portion, a page information portion, a print format specification portion, an output method specification portion, a group printer driver setup information portion, the number of member printers, member printer driver names, a member printer driver setup information portion and so on.

The header portion is the portion for storing the information such as version identification of the file and the file information.

The page information portion is the portion for storing the information such as the number of pages of the document data of the document data portion 7b and size of each page thereof.

The print format specification portion is the portion for storing the information on an output format such as a print page range, print copies, layout information (N-UP, bookbinding print and so on) on the document data and staple and punch instructions.

The output method specification portion is the portion for storing the information, as the output method, such as distributed printing, color-monochrome distributed printing, substitutional printing and broadcast printing.

The group printer driver setup information portion is the portion for storing UI setup information on the group printer drivers mentioned later.

The number of member printers is the portion for storing the number of the member printers associated with the group printer drivers.

The member printer driver name is the portion for storing the printer driver names of the member printers.

The member printer driver setup information portion is the portion for storing DEVMODE information, for instance, as setup information on a driver UI of the member printers.

The member printer driver names and the member printer driver setup information portion have as many storage areas as stored in the aforementioned number of member printers.

The general-purpose print file may also be the file capable of processing a print instruction portion 8a and a document data portion 8b in a separable form. In that case, the print instruction portion exists as a print instruction file and the document data portion exists as a document data file respectively, and it is possible to put them together in one archive format so as to handle them as one file likewise.

When generating the general-purpose print file, the group printer driver 603 described in the above-mentioned FIG. 6 records the setup on a group printer driver GUI in the print instruction portion 7a. Furthermore, the group printer driver 603 converts the data received by GDI into general-purpose data, and records it as a document data in the document data portion of the general-purpose print file.

Figure 8:
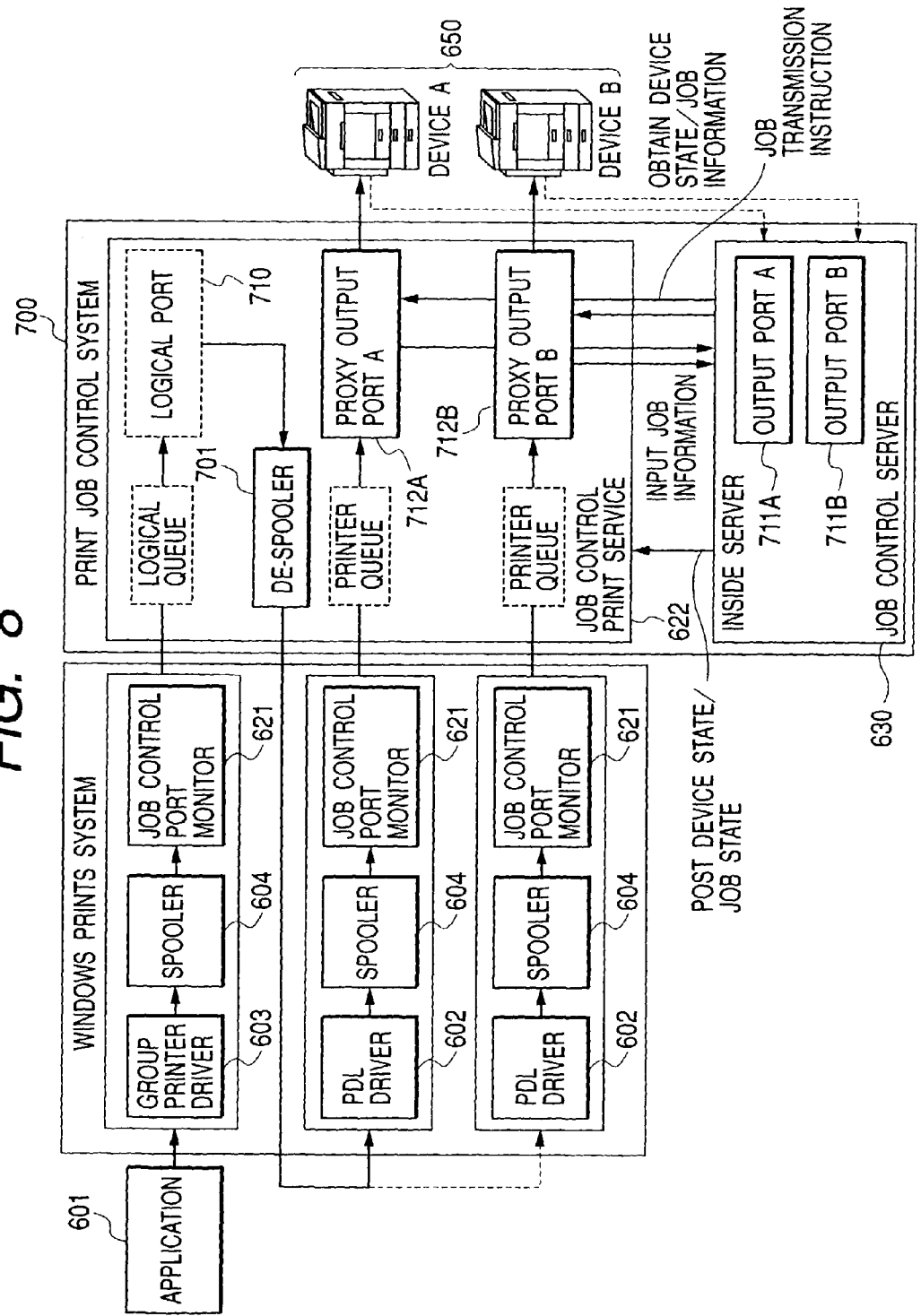
FIG. 8 is a diagram showing a relationship among the print jobs and a process overview in a printing system and the print job control system.

FIG. 8 is a diagram showing a relationship among the print jobs and a process overview in a printing system and the print job control system.

In FIG. 8, the printing system is PrintSystem provided by Windows (R).

In FIG. 8, a print job control system 700 indicates the range of the print job control system astride a physical machine on which the control program of the server and clients operates. Output ports 711A and 711B managed by the server are associated with proxy output ports 712A and 712B of the job control print service 622 of the clients, where all the proxy output ports on each client associated with one port are unitarily managed. The print job data is held by proxy output ports 712A and 712B of each client.

The job control server 630 does not perform a sending process of the print job data itself but only instructs the job control print service 622 to send the print job. In compliance with that instruction, the job control print service 622 of the client sends the print job data to the printer device 650.

Next, a description will be given as to processing in the case where the print job control system 700 performs value-added printing such as the substitutional printing, distributed printing and broadcast printing.

In the case where the print job control system 700 performs the value-added printing such as the substitutional printing, distributed printing and broadcast printing, as mentioned above, the user or the application program 601 must issue the print job together with attribute information to the printer to which the group printer driver 603 is allocated. The job control print service 622 receives the job data processed by the group printer driver 603 as the general-purpose print file via the job control port monitor 621. The job control print service 622 receives this job, and issues the job (member job) to another printer to which the PDL driver is allocated via a de-spooler 701 so as to have the printing performed.

In this case, the de-spooler 701 interprets the print instruction portion 7a of the general-purpose print file described in the above-mentioned FIG. 7, converts the document data in the document data portion 7b into the GDI of Windows (R) and provides the instruction for printing and issues the print job to each printer driver. For instance, in the case where the instruction for 2-UP is recorded in the print format specification portion, the document data equivalent to two pages is laid out in reduced size on one sheet of paper. In the case of the distributed printing or broadcast printing, the jobs are issued to a plurality of member printers described in the print instruction portion 7a according to the setup thereof. In the case of the substitutional printing, the member job is issued according to an advance setup in automatic substitution or according to a user operation in manual substitution when the condition of substitution is satisfied. There is also a presumable form in which instruction information corresponding to each member printer driver is extracted from the print instruction portion 7a to the module different from the de-spooler described above so as to have the extracted print instruction to each member printer driver interpreted by the de-spooler.

When issuing the job to each member printer, the de-spooler 701 needs to create the DEVMODE of each member printer as the print instruction corresponding to the member printer driver. The DEVMODE is generated by appropriately reflecting the contents described in the print instruction portion 8a on the DEVMODE of each member printer.

The job control print service 622 on the client side receives PDL data of each member job having rendering performed thereto by the PDL driver 602 via the job control port monitor 621, informs the server side of the information on the received job, and temporarily holds the job data at its proxy output port 712. Thereafter, it is sent to the printer device 650 after receiving the instruction to send it from the job control server 630.

Figure 9:
FIG. 9 is a diagram illustrating a GUI for showing page specification of a partial printing function of the printing system.

FIG. 9 is a diagram illustrating a GUI for showing page specification of a partial printing function of the printing system, which is implemented by the print manager 623 described above.

Hereafter, a description will be given according to the flowchart as to the processing in the distributed and substitutional printing systems based on the mechanism described earlier by using FIGS. 1 to 8.

Figure 10:
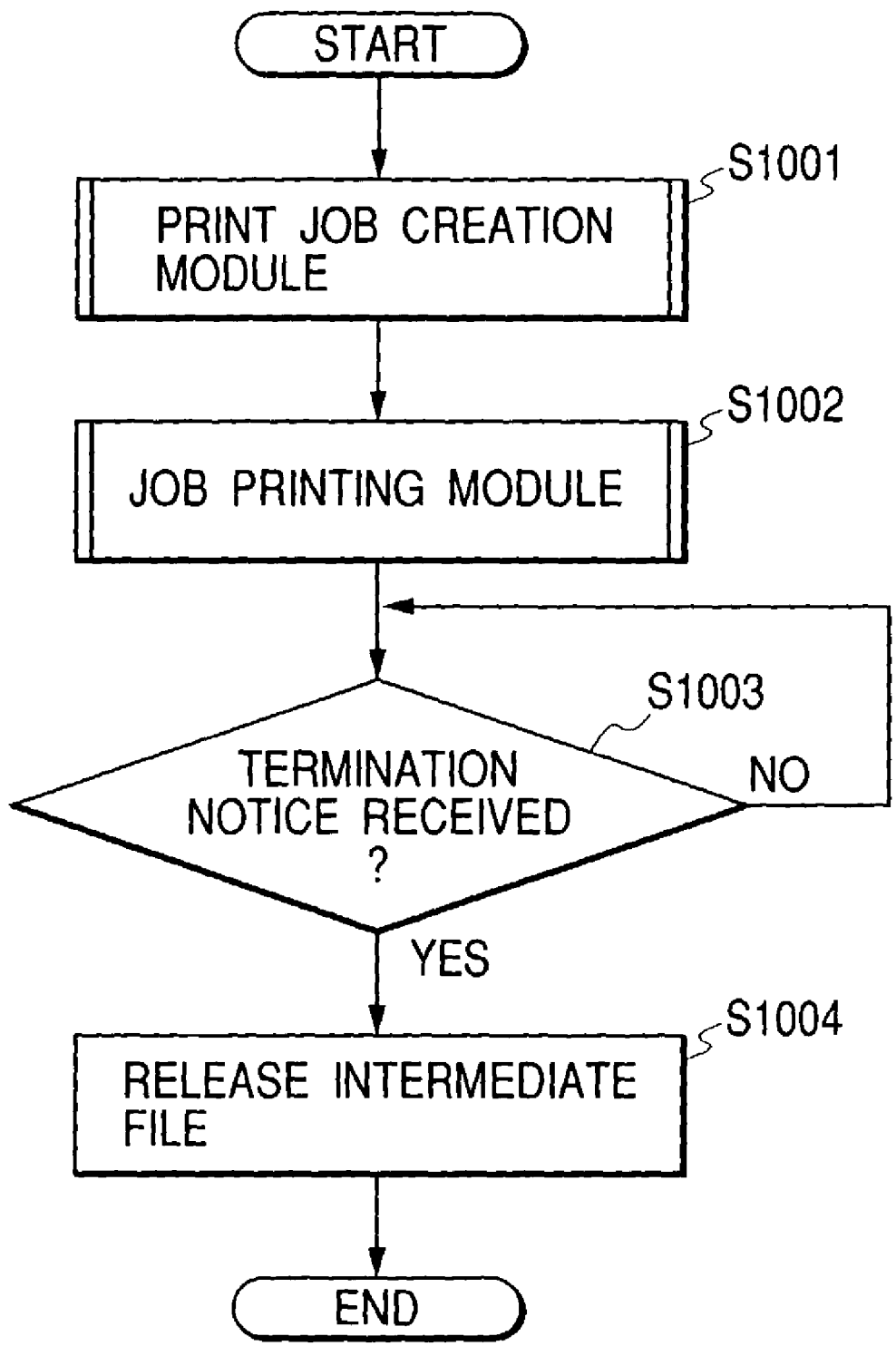
FIG. 10 is a flowchart showing a general algorithm of distributed and substitutional printing.
Figure 11:
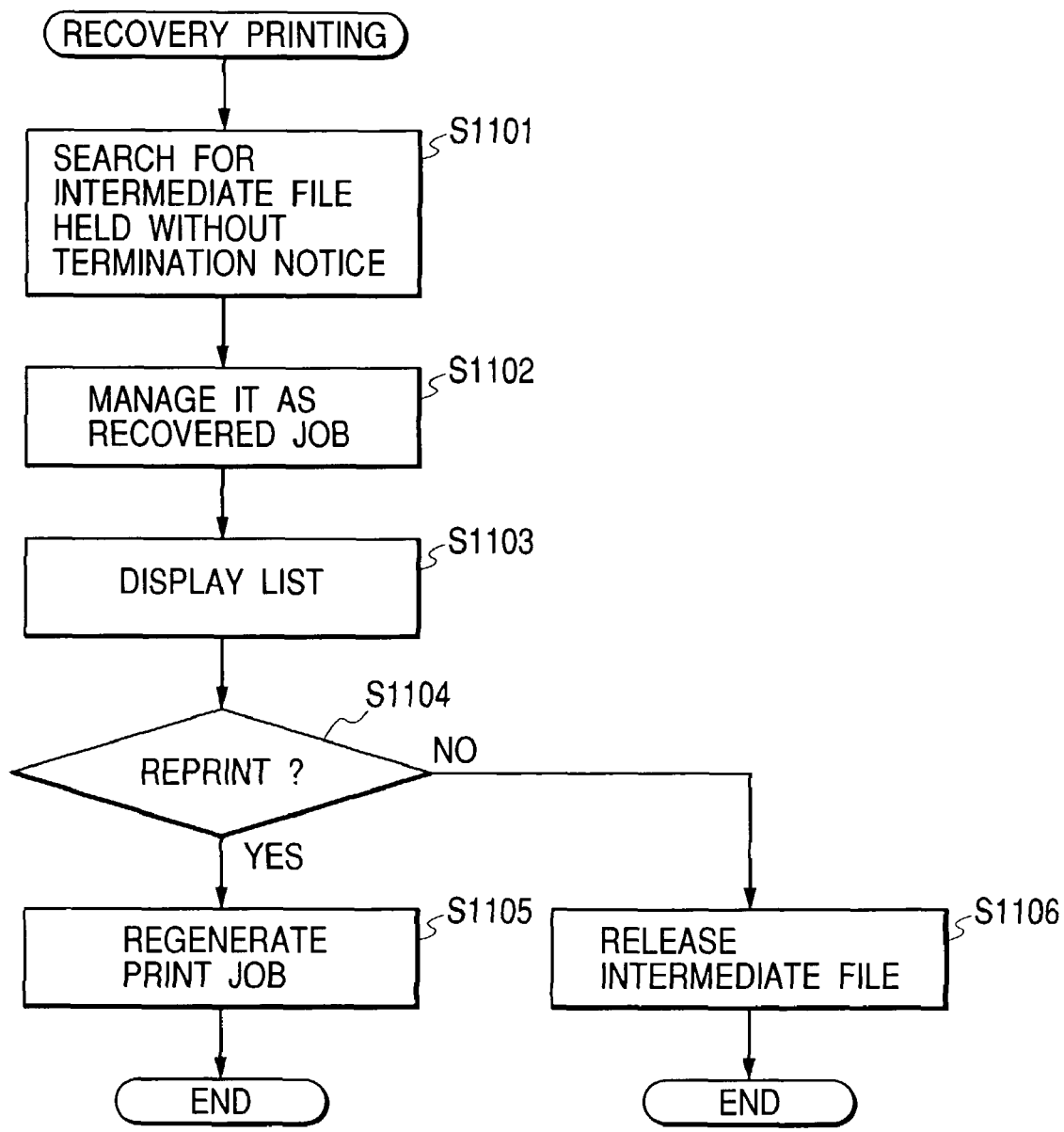
FIG. 11 is a flowchart showing a reprinting algorithm from a remaining intermediate file.

FIG. 10 is a flowchart showing a general algorithm of the distributed and substitutional printing. FIG. 11 is a flowchart showing a reprinting algorithm from a remaining intermediate file. The processing in each step in the flowchart in FIG. 11 is implemented by having a print control module (program) stored in the ROM, auxiliary storage means and so on executed by a central processing unit provided to the apparatus playing a major role in the processing.

If the instruction for printing is provided in the environment in which the print server 101 (host side) or the client computer set the printing destination to the distributed and substitutional printing systems via the systems shown in FIGS. 1 to 8, the distributed and substitutional printing systems have the job divided by the PDL driver 602 and execute a print job creation module by following the instructions of the job control print service 622, and thereby create the child jobs at a set distribution ratio (step S1001) and execute the job print module so as to execute the distributed printing respectively (step S1002). As for the job print module, it is possible to use the print job control system 700 or the job control print service 622 in FIG. 7 described above as an equivalent thereto. In this embodiment, a description will be given as to the distributed printing process utilizing three image forming apparatuses (printers A, B and C respectively) of a "child job 1," "child job 2" and "child job 3" as distributed jobs. A virtual job corresponded with the intermediate file as the base of the "child job 1," "child job 2" and "child job 3" is called a "parent job." The indications of the "parent job.," "child job 1" and "child job 2" in FIG. 9 described earlier are corresponding to the child jobs generated in the step S1001 respectively.

At a distributed printing destination, the attribute information on the print job (whether or not the failure supposedly incapable of continuing the printing has occurred and so on) is determined, and distributed destination information is transferred as required after ensuring that it is in the state possible to normally execute the printing. In the transfer, however, the job control print service 622 holds the distributed destination information by using an intermediate file identifier (identifier of the parent job) as a key in order to trace and manage the print jobs. The distributed destination information also includes print job identifiers (identifiers of the child jobs) of a distributed page description language, which are held on the memory and also held (as attached information) on an auxiliary storage and so on by being attached to a created intermediate file (equivalent to the general-purpose print file described above).

The identifiers of the child jobs and the parent job have the statuses (sending and receiving of the statuses between the job control print service 622 and the job control server 630 in FIG. 6 such as spooling, in operation, halt of printing and normal termination of printing) as the attached information allocated thereto respectively, where the statuses are updated by monitoring of the events notified from the printer device. In the case where the statuses of all the child jobs become the normal termination of printing, the status of the parent job becomes the normal termination so that a releasing (deletion) process of the parent job (intermediate file) is performed (corresponding to a step S1004).

The attached information includes the information on the page range of each distributed job on the distributed printing and up to what page the printing was normally terminated. The monitoring and management of the statuses of the parent and child jobs and the printer devices are performed by the job control print service 622 described above, for instance. The mechanism according to this embodiment has the mechanism for managing the attached information so as to allow the step S1004, the process in FIG. 11 mentioned later and presentation of the UI in FIG. 9.

If the termination of the parent job is recognized based on the statuses of a plurality of child jobs (step S1003), the intermediate file and the attached information related thereto (including the attached information of the parent and child jobs) are released (step S1004). The releasing process of the parent job in the step S1004 corresponds to the normal termination of all of the plurality of child jobs (distributed jobs).

In the case where the host side is powered down due to some failure in a stage in which the normal termination of the parent job is not recognized by the printing system in the step S1003, a recovery printing process is started when starting the host next time (FIG. 11). In the case of starting the recovery printing process, it corresponds to having the system cut off without completion of the print job recognized by the printing system. As for the cases where the host needs to be restarted, the cases of a system freeze and a restart after the termination of a print application are presumed in addition to sudden power-down. It is checked as to the termination of the parent job, that is, whether or not there is a child job yet to be terminated by referring to the attached information. If there is the child job of which printing is yet to be terminated, it corresponds to the intermediate file remaining. A search is performed for the intermediate file (parent job) corresponding to the child job of which printing is yet to be terminated (step S1101), and the child job which may have failed without receiving a termination notice is regenerated from the intermediate file (the above-mentioned general-purpose print file) and managed as a recovered job (step S1102). In the steps S1101 and 1102, the distributed jobs considered to have received no printing termination notice are managed.

The printing termination may be based on the printing termination notice from the device. It is presumable in reality, however, that it is based on termination of the transfer of the print job from the host computer to the device.

The recovered jobs are displayed as a list as shown in FIG. 9 (step S1103). FIG. 9 indicates that it is not clear whether or not the printing is completed, such as the host computer powered down with the "child job 1" and "child job 2" unfinished. It also indicates that, as the "child job 3" is not on the list, the printing termination notice corresponding to the child job 3 was given and the "child job 3" has normally terminated the printing. In the list, display control of the parent job corresponding to the child jobs is also performed. It is thereby possible to easily learn which parent job a possibly unfinished child job is corresponding to. Thus, the display in FIG. 9 allows the user to take a look at the possibly unfinished jobs. It also became possible, in the case where the system is restarted without receiving the printing termination notice from each printer after sending the distributed print jobs to a plurality of printers respectively in the steps S1101 and 1102, to recover the distributed jobs based on the intermediate file for generating each distributed job of the distributed print job.

It is possible, as for the recovered jobs displayed on the list, to provide an instruction for reprinting by selecting them individually or entirely. It is determined whether or not there is the instruction for reprinting (step S1104). In the case where there is the instruction for reprinting, as for the print job (child job) so instructed, regeneration is performed from the intermediate file for the sake of re-creating the print job corresponding to the print page range of the child job included in the attached information of the child job (step S1105) so as to re-execute the printing process (S1001). It is also feasible, in the step S1004, to provide means to be performed to each of the child jobs displayed on the list or generate from the intermediate file the child job selected for reprinting from the list in FIG. 9. The list in FIG. 9 can be displayed by the print manager 623 according to the instruction of the job control print service 622 and besides, the instruction for reprinting can be selectively executed by each child job. Therefore, it is possible for instance, of the plurality of child jobs for the distributed printing, to present only the ones not recognized to have finished the printing as reprinting candidates. It is realized by holding the status of each child job relating to the printing termination included in the attached information on a client machine (information processing apparatus) and referring to the held attached information.

In the case where, though no termination notice has been received, the user determines that it has been terminated or the reprinting is unnecessary, it is possible to release (delete) the intermediate file (step S1106) and abort the printing process.

As described above, when restarted without recognizing the termination of a transferred job, the printing system according to this embodiment presents the list for prompting the user to reprint it. Therefore, for example, even in the case where the host computer is powered down due to a sudden power failure, it can provide an opportunity for efficient reprinting to the user.

It is also possible to provide the distributed and substitutional printing systems allowing the user to confirm the termination notice as to the print jobs distributed to a plurality of locations as a result of the printing termination as against printing specification before being distributed in timing for receiving each page ejection output and capable of, in the case where the host side is powered down before receiving the termination notice, assuring the printing when powered up again by putting in the job again in a complete form from the held intermediate file having received no termination notice.

As described by referring to FIG. 9, the distributed jobs recognized to have already completed print output and those not recognized so are separately managed, and when recovering the jobs on restarting a personal computer (information processing apparatus), it can realize a reprinting environment of the efficient distributed printing because it presents the child jobs yet to complete the printing in response to the parent job in a form identifiable and capable of instructing the user to reprint them.

Moreover, as an instruction button for canceling the reprinting is included in the list for prompting the user to perform the reprinting in FIG. 9, the user can cancel the reprinting of the child jobs in the case where the print output is normally outputted in reality according to the user's visual check, for instance, so as to realize a further efficient printing environment. Further in detail, it is possible, by providing the input means for cancellation to the user interface for reprinting the jobs unclear as to whether or not the printing has been completed, to determine whether or not to perform the reprinting by reflecting the user's visual check or the user's will thereon so as to realize a further efficient printing environment.

As described in detail above, according to the present invention, the print job sent to an input-output apparatus is recovered in the case where the system is restarted without receiving the printing termination notice from the above described input-output apparatus after sending the distributed job, and so the recovered distributed job can be sent to the input apparatus after the system is restarted. The printing by the input-output apparatus can thereby be assured.

What is claimed is:

1. A print control method carried out in a host computer connected to a plurality of printing apparatuses having a printing function via a network for bi-directionally communicating with the plurality of printing apparatuses, comprising:

an output step that outputs a plurality of distribution print jobs generated from an intermediate file to respective ones of the plurality of printing apparatuses;

a release step that releases the intermediate file when a termination notice is received from each of the plurality of printing apparatuses, the termination notice indicating that the printing apparatus has terminated printing of a distribution print job outputted to the printing apparatus;

a management step that manages one or more of the plurality of distribution print jobs for which the termination notice has not been received;

a search step that searches the intermediate file corresponding to the one or more of the plurality of distribution print jobs managed in said management step as a distribution print job for which the termination notice has not been received, in the case where said host computer is restarted after the plurality of distribution print jobs are outputted and before the termination notices are received from the plurality of printing apparatuses;

a recovery step that recovers the plurality of distribution print jobs from the intermediate file searched in said search step;

a display control step that controls a display unit to display a list of the one or more distribution print jobs managed in said management step as a distribution print job for which the termination notice has not been received such that the one or more distribution print jobs displayed in the list are identifiable from each other and can be individually instructed to reprint, wherein the one or more distribution print jobs in the list include a distribution print job for which printing has not been terminated and a distribution print job for which printing has been terminated but the termination notice has not been received because of the restart of said host computer, and do not include a distribution print job for which the termination notice has been received;

an input step that inputs an instruction to selectively execute the plurality of distributed print jobs recovered in said recovery step; and a reprint step that regenerates a distribution print job corresponding to one designated from among the one or more distribution print jobs displayed in the list and executes a reprint process based on the intermediate file.

2. A method according to claim 1, wherein said display control step controls the display unit to display the list such that a virtual job is identifiably displayed as a source of the plurality of distribution print jobs.

3. A host computer connected to a plurality of printing apparatuses having a printing function via a network for bi-directionally communicating with the plurality of printing apparatuses, comprising:

an output unit that outputs a plurality of distribution print jobs generated from an intermediate file to respective ones of the plurality of printing apparatuses;

a release unit that releases the intermediate file when a termination notice is received from each of the plurality of printing apparatuses, the termination notice indicating that the printing apparatus has terminated printing of a distribution print job outputted to the printing apparatus;

a management unit that manages one or more of the plurality of distribution print jobs for which the termination notice has not been received;

a search unit that searches the intermediate file corresponding to the one or more of the plurality of distribution print jobs managed in said management unit as a distribution print job for which the termination notice has not been received, in the case where said host computer is restarted after the plurality of distribution print jobs are outputted and before the termination notices are received from the plurality of printing apparatuses;

a recovery unit that recovers the plurality of distribution print jobs from the intermediate file searched in said search unit;

a display control unit that controls a display unit to display a list of the one or more distribution print jobs managed by said management unit as a distribution print job for which the termination notice has not been received such that the one or more distribution print jobs displayed in the list are identifiable from each other and can be individually instructed to reprint, wherein the one or more distribution print jobs in the list include a distribution print job for which printing has not been terminated and a distribution print job for which printing has been terminated but the termination notice has not been received because of the restart of said host computer, and do not include a distribution print job for which the termination notice has been received;

an input unit that inputs an instruction to selectively execute the plurality of distributed print jobs recovered by said recovery unit; and a reprint unit that regenerates a distribution print job corresponding to one designated from among the one or more distribution print jobs displayed in the list and executes a reprint process based on the intermediate file.

4. A host computer according to claim 3, wherein said display control unit controls the display unit to display the list such that a virtual job is identifiably displayed as a source of the plurality of distribution print jobs.

5. A computer program stored on a computer-readable storage medium for causing a computer to execute a print control method according to claim 1.

6. A computer-readable storage medium which stores a computer program for causing a computer to execute a print control method according to claim 1.

* * * * *